United States Patent
Fishbein et al.

(10) Patent No.: US 7,309,975 B2
(45) Date of Patent: Dec. 18, 2007

(54) PROCESS FOR OPERATING A SWITCHING POWER SUPPLY

(75) Inventors: Omri Fishbein, Kibbutz Ein Hashofet (IL); Eran Erez, Kibbutz Ein Hashofet (IL)

(73) Assignee: Eltam Ein Hashofet, Kibbutz Ein Hashofet (IL)

( * ) Notice: Subject to any disclaimer, the term of this patent is extended or adjusted under 35 U.S.C. 154(b) by 0 days.

(21) Appl. No.: 11/433,574

(22) Filed: May 15, 2006

(65) Prior Publication Data
US 2006/0255776 A1    Nov. 16, 2006

(30) Foreign Application Priority Data
May 16, 2005    (IL) .................................... 168598
Jun. 20, 2005    (IL) .................................... 169291

(51) Int. Cl.
*G05F 1/62*    (2006.01)
*G05F 1/70*    (2006.01)

(52) U.S. Cl. ................... 323/259; 323/271; 323/285

(58) Field of Classification Search ............... 323/222, 323/223, 225, 259, 266, 268, 271, 282, 285, 323/344
See application file for complete search history.

(56) References Cited

U.S. PATENT DOCUMENTS

| | | | |
|---|---|---|---|
| 5,134,355 A * | 7/1992 | Hastings | 323/211 |
| 5,602,463 A * | 2/1997 | Bendall et al. | 323/266 |
| 6,677,734 B2 * | 1/2004 | Rothleitner et al. | 323/259 |
| 6,788,033 B2 * | 9/2004 | Vinciarelli | 323/225 |

* cited by examiner

*Primary Examiner*—Gary L Laxton
(74) *Attorney, Agent, or Firm*—Kenyon & Kenyon LLP

(57) ABSTRACT

There is provided a process for operating a switch mode power supply circuit (Switcher) connectable to a load, the circuit having a first buck switch, a second boost switch and an inductor in a buck boost circuit, the process including applying input voltage to the circuit, selectively activating each of the buck switch and boost switch, and selectively limiting the ON-time of the buck switch, for accelerating discharge of the inductor.

26 Claims, 5 Drawing Sheets

PROCESS FOR OPERATING A SWITCHING POWER SUPPLY

FIELD OF THE INVENTION

The present invention relates to the operation of Switching Power Supply Circuits (hereinafter "Switchers"), e.g., Power Factor Correction (PFC) circuit, DC-DC Converter (DDC) etc.; and more particularly to a process for operating and monitoring the operation of Switchers in an efficient and safe manner utilizing various applications, including DC motors, computers, television sets, etc.

BACKGROUND OF THE INVENTION

In recent years, an increasing number of electronic devices fed from the municipal electricity supply and/or various DC sources are used in households, hospitals, military, industry, etc. State of the art power supplies employ a circuit comprising a passive input filter, a DDC or a PFC stage and additional circuits according to a particular application. Switchers are designed to operate in buck, buck-boost or boost modes depending on the instantaneous input voltage (Vin) and output voltage (Vo) of the circuit. Consequently, unnecessary losses and harmonic distortions are developed in the circuit, specifically, but not exclusively, during transitions between modes and during buck-boost mode.

SUMMARY OF THE INVENTION

It is therefore a broad object of the present invention to overcome the disadvantages of the prior art processes for operating Switchers, and to provide a process for operating these circuits in a manner that improves their efficiency, total harmonic distortion (THD) and safety of operation.

It is a further object of the present invention to provide a process for operating these circuits that secures efficient transitions between modes and efficient control of the operation during each mode.

It is still a further object of the present invention to provide load protection and to lower losses, electromagnetic interference (EMI) generation and circuit cost.

In accordance with the present invention there is therefore provided a process for operating a switch mode power supply circuit (Switcher) connectable to a load, said circuit including a first buck switch, a second boost switch and an inductor in a buck boost circuit, said process comprising applying input voltage to the circuit, selectively activating each of said buck switch and boost switch, and selectively limiting the ON-time of the buck switch, for accelerating discharge of said inductor.

In accordance with another aspect of the invention an algorithm is provided for digital control of a 2-switch PFC active filter. This algorithm is based on the mean value of the ratio Vin/Vout of the filter. A power factor higher than 0.96 (actually about 0.99) and input current total harmonic distortion (THD) lower than 10%, are thereby achievable within a very wide range of Vin and Vo.

Still further, according to the invention the operation of the Switcher comprises boost and Modified Boost modes, both critically discontinuous. The boost mode is achieved with the buck switch continuously conducting and the boost switch operating at high frequency. When the input DC or rectified AC instantaneous voltage approaches the value of the output DC voltage, a "watchdog" timer is activated in the control circuit of the buck switch to block the switch when the inductor's discharge duration becomes too long, say, twice the charge time. Consequently, the inductor discharge is substantially accelerated and appropriate operating frequency is maintained. When the inductor current has discharged, both switches begin conduction substantially simultaneously thus initiating a new cycle of "discharge-time-limited" boost (Modified Boost). The Modified Boost mode during the phase in which the input DC or rectified AC voltage value is between 70 to 130% of the value of the output DC voltage, improves the efficiency of the circuit and smoothes the transitions between the modes.

A further feature of the present invention is a procedure that facilitates smooth transitions from mode to mode of the circuit operation, i.e. the transitions from buck to buck-boost, from buck-boost to boost and vice versa, during which reduction of watt-loss, peak current and THD are achievable. The procedure consists of a turn-on of each switch near zero current of the inductor followed by control of the ON-time of each switch as follows:

The buck switch ON-time is gradually reduced and the boost switch ON-time is gradually increased during transition from buck operation mode to buck-boost or Modified Boost operation mode and during transition from boost operation mode to buck-boost or Modified Boost operation mode of the circuit; and the buck switch ON-time is gradually increased and the boost switch ON-time is gradually reduced during transition from buck-boost or Modified Boost operation mode to boost operation mode and during transition from buck-boost or Modified Boost operation mode to buck operation mode of the circuit.

A still further feature of the present invention relates to the fact that boost mode switching power circuits operating in discontinuous current mode require that output voltage be sufficiently higher than input voltage in order to secure short enough discharge time of the inductor. Too long discharge time may lower the circuit operating frequency down to values that will impair the efficiency of the input passive filter or even resonate with it.

Furthermore, should the input voltage rise above the output voltage due to some reason, the boost control mechanism would breakdown and the output voltage would be forced up to the peak value of the input voltage. Consequently, the output voltage would rise to values that may risk the load, and substantial current pulses through the input filter would be formed.

Therefore, it is desirable to protect boost mode circuits from the above-mentioned negative consequences during any period and thus to establish a "Protected Boost Mode". Such protection can be provided by means of a serial switch and a parallel diode that are added to the boost topology to actually form the circuit. When the control system of the Switcher identifies that the discharge time of the inductor is longer than a predetermined value (a value that still secures suitable operating frequency), it opens the serial (buck) switch, thus forcing the inductor to complete the discharge through the diodes, into the capacitor and the load. The discharge time is thereby considerably reduced and a suitable frequency is maintained. Following the discharge of the inductor, switches resume conduction state and the control system selects, according to the discharge time of the inductor, whether to resume the conventional boost operation or to remain in the Protected Boost mode. Hence, full control of output voltage and input current of the Switcher are secured under any circumstance, due to the buck switch ON-time limitation described above.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of an embodiment of a programmable Switcher circuit according to the present invention;

FIG. 2 is a schematic circuit diagram of an embodiment of a two-switch Switcher circuit;

FIGS. 3A and 3B are flow diagrams illustrating a preferred embodiment of the process according to the present invention;

FIG. 4 is a plot of a prior art input current half wave envelope of PFC Switcher application;

FIG. 5 is a plot of an input current half wave envelope of a PFC Switcher embodiment according to the invention;

FIG. 6 is a plot of inductor current vs. time during Modified Boost mode when the Switcher instantaneous Vin is lower than the Switcher Vo;

FIG. 7 is a plot of inductor current vs. time during Modified Boost mode when Vin=Vo, and FIG. 8 is a plot of inductor current vs. time during Modified Boost mode when Vin>Vo.

DETAILED DESCRIPTION

Figure 1:
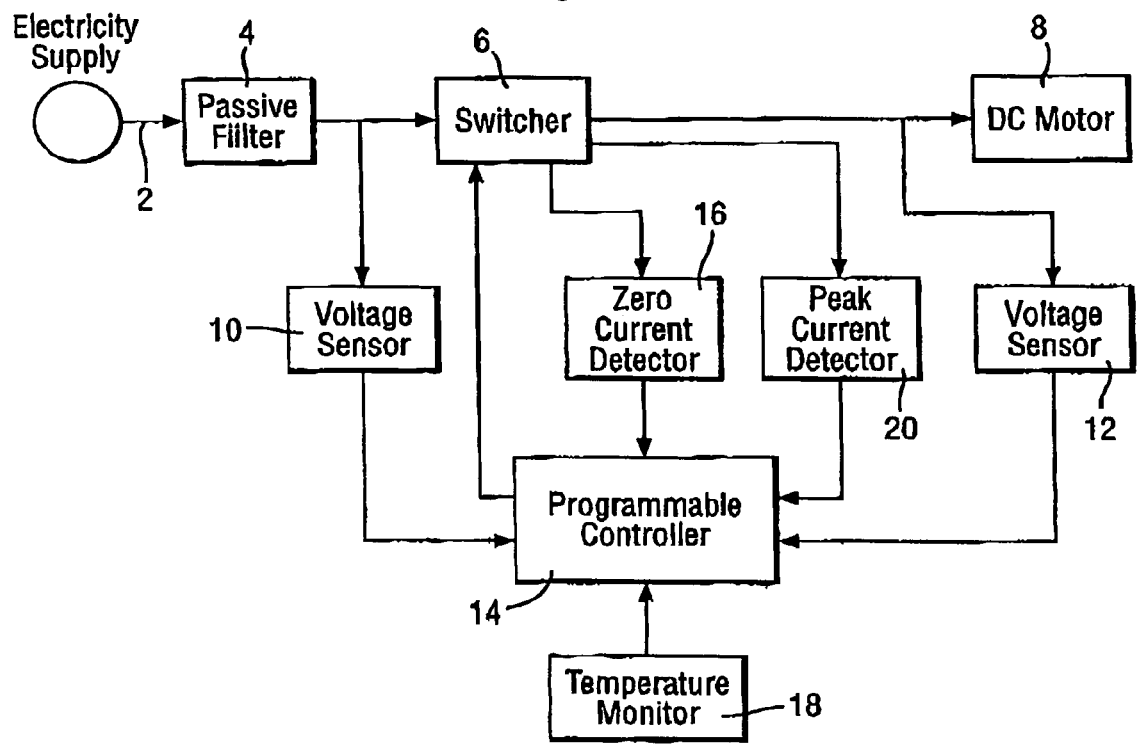

In FIG. 1 there is illustrated a block diagram of an embodiment of a programmable circuit for the implementation of the present invention. The electrical energy flows from an electrical supply source via line 2 through a passive filter 4, a Switcher stage 6 into a load 8 e.g., a DC motor. Two voltage sensors 10 and 12 are provided that sense the Switcher input voltage and its output voltage, respectively and deliver the respective voltage data to a programmable controller 14. Also provided is a zero current detector 16 and a temperature monitor 18 that delivers to the controller 14 data relating to the circuit temperature, thereby enabling the controller 18 to prevent excessive temperatures in the Switcher stage 6, by reducing the power delivered through the circuit to the DC load 8. Load current is sensed and monitored through a peak-current-detector 20.

Figure 2:
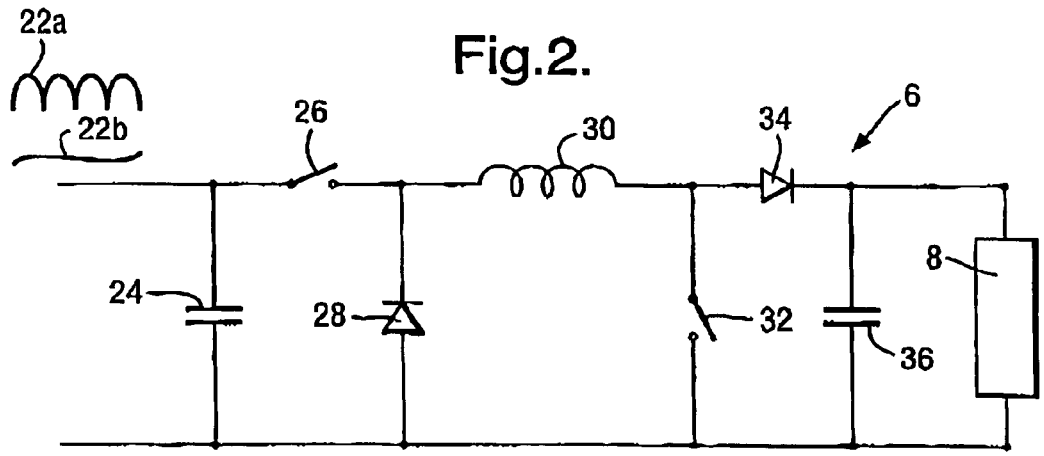

FIG. 2 illustrates a preferred, non-limiting embodiment of the Switcher stage 6, having substantially positive input voltage 22a, e.g., a rectified sinusoidal voltage or 22b, e.g., slowly changing DC voltage. The circuit comprising a filter capacitor 24, a buck switch 26, a free wheeling diode 28, an inductor 30, a boost switch 32, a blocking diode 34 and a DC tank 36 e.g., a capacitor and load 8, to which it is connectable.

Figure 3A:
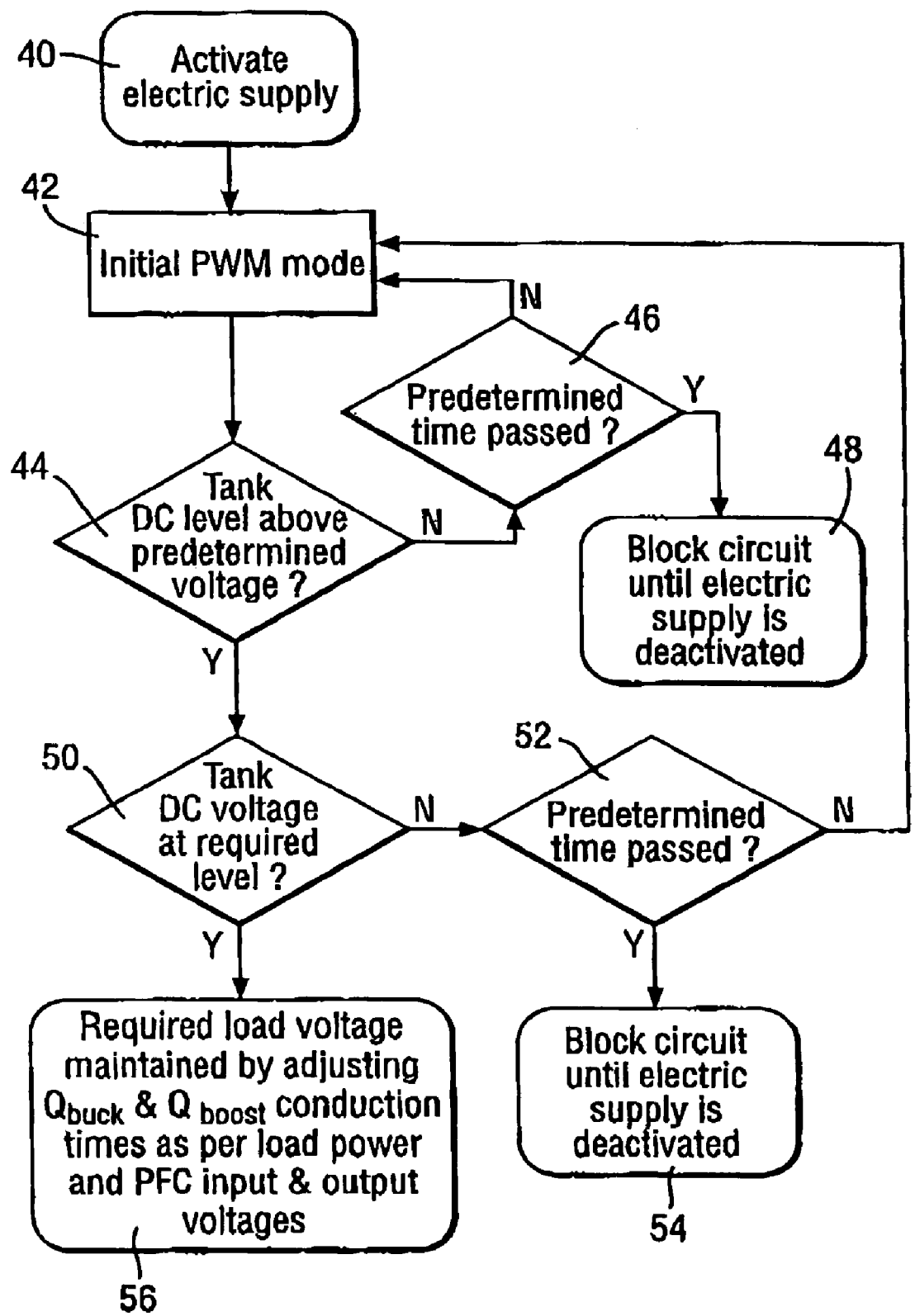
Figure 3B:
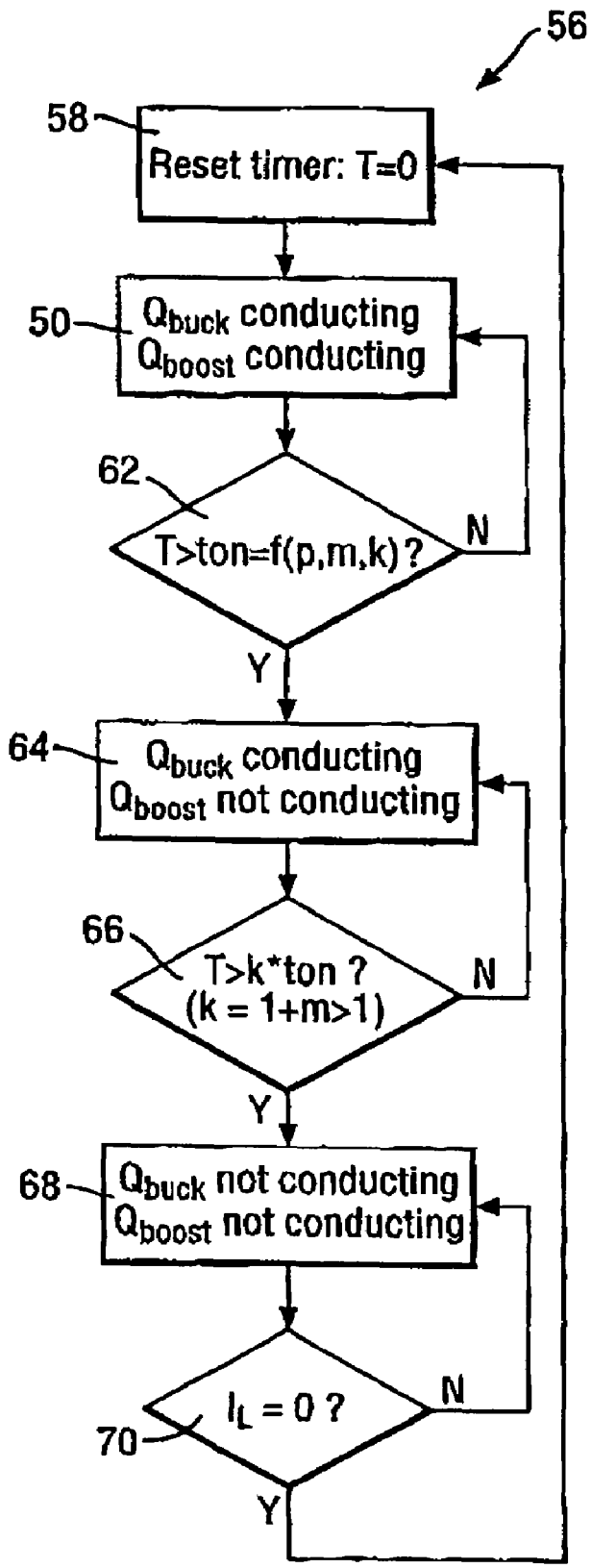

FIGS. 3A and 3B illustrate flow diagrams of a preferred embodiment of the process according to the invention. Following activation (40) of the circuit, electrical energy flows into the circuit from an electricity supply source and actuates the circuit's controller 14, which operates the circuit in Pulse Width Modulation (PWM) mode (42) in a safe buck-boost mode, thus loading a DC tank 36 (FIG. 2) of the Switcher stage 6 and preparing it to operate the DC motor at its starting phase. The controller 14 now checks the voltage across the DC tank 36 of the Switcher stage 6 and measures the time which has elapsed. If the voltage is below a predetermined value (44 N) and the time elapsed is less than a predetermined period (46 N), the charging of the DC tank 36 proceeds. If the time has elapsed (46 Y) the circuit is blocked assuming charging problem exists, until the electricity supply is deactivated (48). Upon reaching the predetermined voltage value (50 Y), the controller 14 begins to operate the circuit in a steady state according to step (56) detailed by blocks 58 to 70 (FIG. 3B). Should the tank DC voltage fail to reach the predetermined value (50 N) and predetermined time has not yet elapsed (52 N), the Switcher continues to operate in initial PWM mode (42). When predetermined time elapsed (52 Y), the circuit is blocked (54) assuming charging problem exists, until the electricity supply is deactivated. The loop shown in FIG. 3B comprising blocks 58 to 70 contained in block 56, operates as follows: A timer of the controller 14 is set to zero (58, T=0) following approximately zero current through inductor 30 (FIG. 2). Then the Switcher stage 6 switches 26 and 32 are activated (60). The conduction time $t_{on}$ of switch 32 ($Q_{boost}$) (62) is determined by the function f(p,m,k) to be explained hereinafter. If the time T elapsed is T<f(p,m,k) (62 N), both switches remain conducting. If the time T elapsed is >f(p, m,k) (62 Y), switch 32 turns off. The conduction time of switch 26 ($Q_{buck}$) (66) is determined by the function k·f(p, m,k). If the time elapsed T is T>k·f(p,m,k) with k=1+m (66 Y), k and m to be explained hereinafter, switch 26 is turned off thus both switches 32 and 26 are not conducting (68) until the inductor current has discharged (70 Y) following which the cycle is resumed (58).

In some PFC applications, a two-switch PFC configuration (FIG. 2 with input 22a) is operated in three different modes every half cycle of the input AC voltage, i.e., boost, buck-boost and buck modes. If the switches ON-time and OFF-time are properly adjusted according to the ratio of the input rectified AC voltage to the output DC voltage and according to the PFC Switcher operation mode, an average input current having a scaled shape of the input voltage wave shape can be realized. This process requires four mode-transitions during each AC voltage half cycle. The transitions from mode to mode, i.e., from buck to buck-boost, from buck-boost to boost and vice versa, also call for efficiency and continuity improvements, e.g., reduction of watt-loss, peak current and THD.

Figure 4:
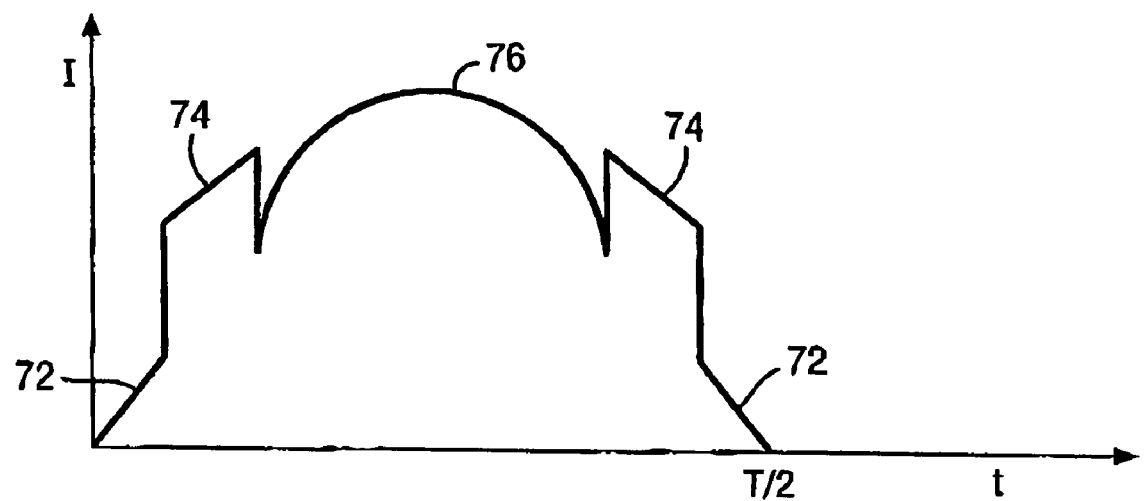

FIG. 4 illustrates a plot of typical prior art input current half wave envelope of a PFC Switcher comprising boost phases 72, buck-boost phases 74 and a buck phase 76. The shape of the current wave envelope is not smooth due to the abrupt transitions between the various phases. Transition from mode to mode is required according to the instantaneous ratio of the input voltage to the output voltage of the PFC. Under these circumstances the PFC Switcher starts operating in the boost mode when the AC cycle begins. In boost mode the buck switch is conducting continuously and the boost switch is operating at high frequency. When the input rectified AC voltage approaches the DC output voltage value, the PFC Switcher shifts to a second mode called buck-boost. In this mode, both switches are active at high frequency. The buck-boost mode is maintained until the rectified AC input voltage value rises above the output DC voltage, e.g. by 30%, after which the PFC Switcher shifts to the buck mode in which the buck switch is activated at high frequency and the boost switch is open. The buck mode is maintained during the rest of the rising portion of the rectified AC voltage cycle, and during the initial phase of the falling portion of the input rectified AC voltage. During the falling portion, when the rectified AC input voltage value approaches the value of the DC output voltage from above, the PFC Switcher shifts back to the buck-boost mode and later to the boost mode according to the logic described above. This process requires four mode transitions during each AC voltage half cycle.

Figure 5:
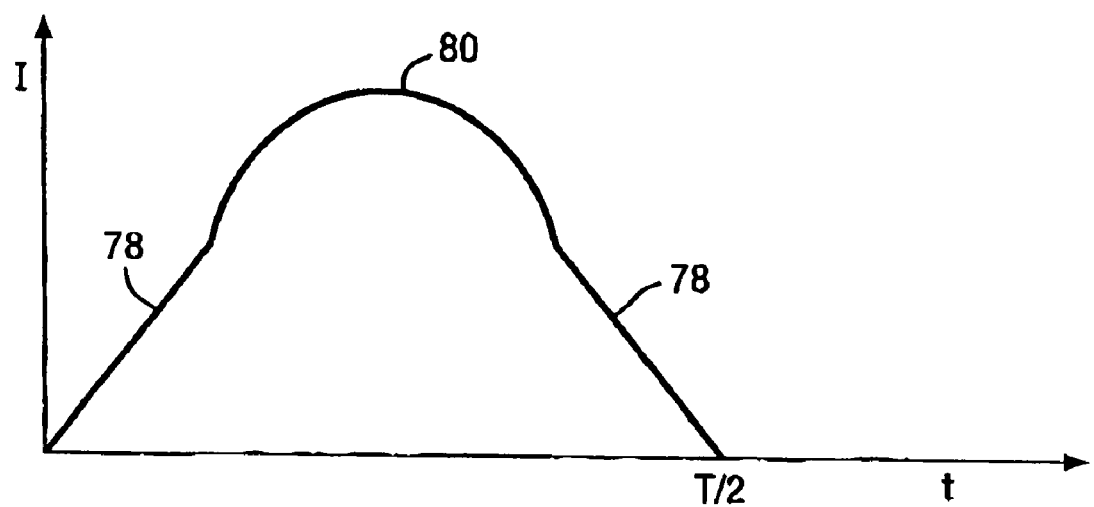

FIG. 5 illustrates a plot of input current half wave envelope according to the invention including boost/Modified Boost stages 78, during which the transitions between classical boost and Modified Boost are gradual and smooth. Also shown is the buck stage 80. According to the invention the operation of the PFC Switcher comprises at least boost and Modified Boost modes, both critically discontinuous. A boost mode is achieved with the buck switch continuously conducting and the boost switch operating at high frequency. When the input rectified AC instantaneous voltage approaches the value of the output DC voltage, a "watchdog" timer is activated in the control circuit of the buck switch. The timer blocks the buck switch when the discharge duration of the inductor becomes too long, say, twice the charge time. Consequently the inductor discharge is substantially accelerated and thereby appropriate operating frequency is maintained. When the inductor current has discharged, both switches start conducting near zero current of the inductor, thus initiating a new cycle of "discharge-time-limited" boost (Modified Boost). The Modified Boost mode during the phase in which the input rectified AC voltage is approximately between 70 to 130% of the output DC voltage value, improves the efficiency of the circuit and facilitates smooth transitions between the modes.

Referring again to FIG. 2, there are seen buck switch 26, boost switch 32 and inductor 30. During buck operation mode, switch 32 is permanently open while switch 26 changes states at high frequency. During boost operation mode switch 26 is permanently closed while switch 32 changes states at high frequency. During buck-boost operation mode and during transitions between the operation modes, both switches change states at high frequency.

The switches 26, 32 are activated near zero current of the inductor 30. Then, the ON-time of each switch is controlled in order to facilitate efficient transition between the modes of operation, e.g., reduction of watt-loss, peak currents and THD, the ON-time is controlled in the following manner:

buck switch (26) ON-time is gradually reduced and the boost switch 32 ON-time is gradually increased in order to facilitate efficient, i.e., smooth transition from buck operation mode to buck-boost/Modified Boost operation mode and from boost operation mode to buck-boost/Modified Boost operation mode of the PFC Switcher.

buck switch (26) ON-time is gradually increased and the boost switch (32) ON-time is gradually reduced in order to facilitate efficient transition from buck-boost/Modified Boost operation mode to boost operation mode and from buck-boost/Modified Boost operation mode to buck operation mode of the PFC Switcher.

Figure 6:
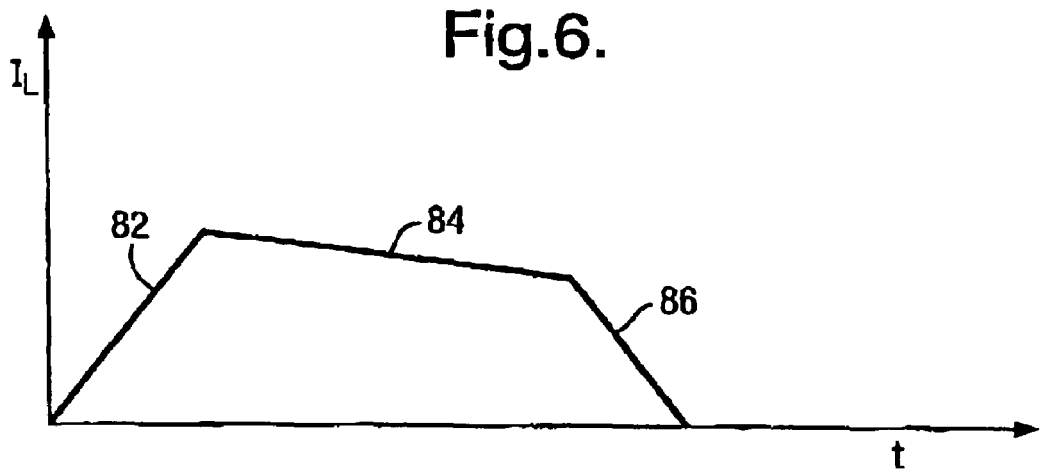
Figure 7:
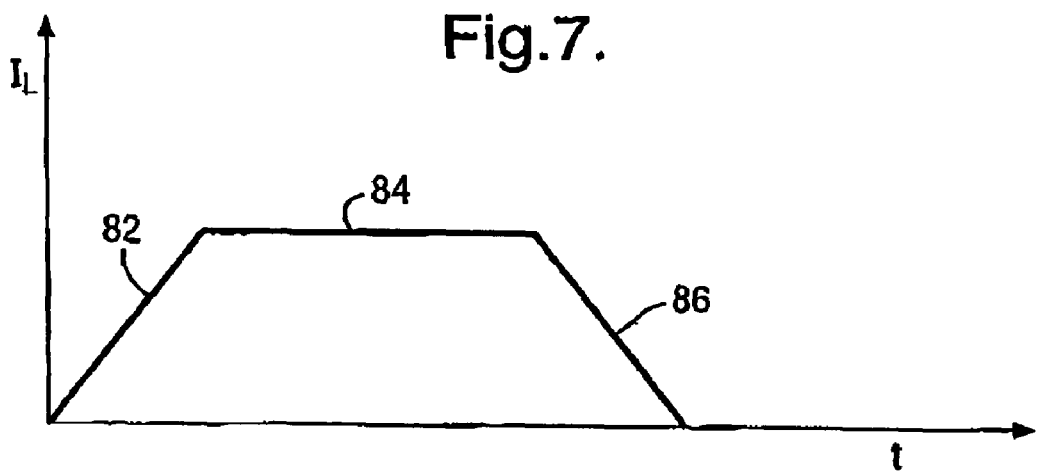
Figure 8:
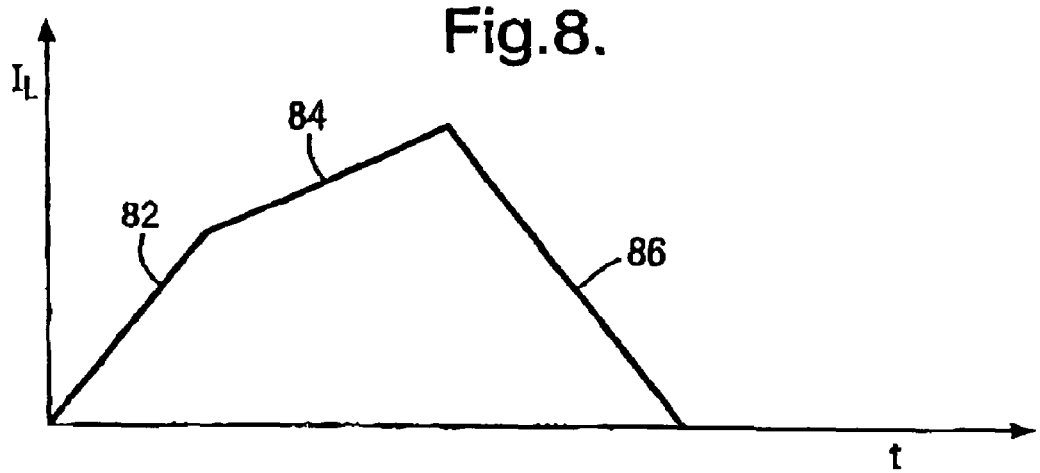

FIGS. 6, 7 and 8 illustrate the current versus time of the inductor 30 for three different cases, respectively. Line or segement 82 depicts the inductor current when switches 26 and 32 are both conducting and the inductor 30 is charged. Line or segment 84 is formed when switch 32 is deactivated and switch 26 is conducting. The slope of the current depends now on the difference between the instantaneous voltage across capacitor 24 (Vin) and the instantaneous voltage across capacitor 36 (Vo), i.e., on the value of Vin−Vo, which can be negative (FIG. 6), zero (FIG. 7) or positive (FIG. 8).

When both switches are not conducting, the inductor current behaves according to line or segment 86 wherein the inductor 30 is rapidly discharged through diode 28, diode 34, into capacitor 36 and the load 8.

Should the Protected Boost/Modified Boost mode maintain reasonable time ratio between the duration of segment 82 and the duration of segment 84, as well as reasonable ratio between Vin and Vo, a nearly fixed proportion between Vin and the average input current ($Iin_{avr}$) would be maintained for changing Vin values. In PFC Switcher systems this feature facilitates application of or transition to Protected Boost mode since sufficiently low current distortions are maintained so that additional current distortion corrections are practically nonessential. Yet, the remaining small current distortions, if any, can still be cancelled by, e.g. introducing suitable correction during segment 82 and maintenance of fixed ratio between the durations of segment 82 and segment 84 ($t_{82}/t_{84}$). This correction is a function of Vin/Vo and $t_{82}/t_{84}$ that is computable during the sine half wave and thereby applies correcting factor during segment 82, which secures fixed proportion between Vin and $Iin_{avr}$. This is a practical solution, but requires high and rapid computation power, since the relation between the correcting factor and the ratios Vin/Vo and $t_{82}/t_{84}$ is a rational function of Vin/Vo having $2^{nd}$ degree polynomial of Vin/Vo in the numerator and linear polynomial in the denominator.

More specifically, denoting the buck switch 26 ON-time as $t_{buck}$ and the boost switch 32 ON-time as $t_{boost}$ and maintaining $t_{buck}-t_{boost}=k\ t_{boost}(k=2\ldots 6)$, then $t_{boost}=(2LPin/V^2in_{rms})\ g(k,Vin/Vo)$ wherein L is the inductance of inductor 30, Pin is the circuit input power, and $g(k,Vin/Vo)$ is the correction factor required to maintain fixed proportion between Vin and $Iin_{avr}$. When $t_{buck}-t_{boost}=k\ t_{boost}$, high k values ($k=2\ldots 6$) facilitate efficient operation in this mode at high Vin/Vo values where normally buck mode is applied.

Defining $t_{boost}=2LPin/V^2in_{rms}$ and $m=Vin/Vo$ and applying some algebra, the equation $t_{boost}=t_{boost}(m^2(1+k)+m)/(m(1+k)^2-k^2)$ may be readily obtained, denoting $g(k,Vin/Vo)=(m^2(1+k)+m)/(m(1+k)^2-k^2)$ and $Vin/Vo=m$.

Maintaining $t_{boost}$ accordingly secures perfect fixed proportion between input voltage waveform and input average current. Thus f(p,m,k) mentioned above in the detailed description of FIG. 3 is defined to be:

$$f(p,m,k)=(2LPin/V^2in_{rms})(m^2(1+k)+m)/(m(1+k)^2-k^2).$$

It can be shown that by selecting $k\approx 2$ without applying any correction factor, a current scaling close enough to a constant value achieves PF>0.985 and line-current THD<7%. As mentioned above, however, k value in the range of 2, does not exhaust the loss reduction potential of this mode of operation, hence a larger k value is desirable. As k value rises, however, THD tends to rise and PF tends to sink. For example, when $k=4$, without applying any correction factor yields a line-current THD≈15% and PF≈0.975. Therefore, a correction factor for k values larger than ~2 will be required in many applications.

It is stated above that the correction factor $(m^2(1+k)+m)/(m(1+k)^2-k^2)$ achieves perfect correction for constant k values. As k value rises, however, computing this correction factor becomes more and more difficult. The reason for this is that for k>2, the function $g(m,k)=(m^2(1+k)+m)/(m(1+k)^2-k^2)$ varies considerably with time (m being a function of time) between the instances $m=k/(k+1)$ and $m=1.0$ and its variation with time in this interval becomes even more and more abrupt, as k value rises. Therefore, due to speed and calculation power limitations of control units, accurate implementation of $(m^2(1+k)+m)/(m(1+k)^2-k^2)$ for constant k values larger than ~3, becomes difficult.

The precise $(m^2(1+k)+m)/(m(1+k)^2-k^2)$ correction factor for constant k values is not necessary. Other correction factors, which vary more slowly with time, can be selected. For example, a correction factor based on appropriate linear functions of m only, each of which has at least one intersection point with the function $(m^2(1+k)+m)/(m(1+k)^2-k^2)$, can also be selected. When such an appropriate factor is applied at a suitable range of m, it can yield excellent results. Consequently, state of the art control units can handle constant k values as high as 5 or 6, and thereby, achieve low watt-loss, as well as PF>0.99 and line-current THD<8%.

Yet further, even more readily computable and feasible perfect correction procedure is achieved by holding the duration of segment 82 ($t_{boost}$) constant during suitable periods (according to the output power) and correcting the ratio between the durations of segment 84 ($t_{buck}-t_{boost}$) and segment 82 ($t_{boost}$) so that the equation $(t_{buck}-t_{boost})/t_{boost}=Vin/Vo$ is maintained.

Further features of the invention achievable through programming of controller 14 comprise:

limiting the current during discontinuous-critical-current mode (DCCM) by controlling the charge time of an inductor, e.g., the PFC Switcher inductor 30;

protecting against voltage surges by a short-term shutoff of the Switcher input circuit the shutoff is activated by the controller during the development period of the surge and deactivated following the fading of the surge;

protecting against overheating by reducing the power delivered to the load;

protecting against short circuit by shutoff of the circuit by several parallel procedures triggered by the controller 14 and related to known load characteristics, e.g., a comparison of a short-term mean value of the load voltage to a long-term mean value of the load voltage, sensing of high current and comparing long term mean value of the load voltage with a predetermined minimum, and limiting the power delivered by the Switcher to a predetermined maximum.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for operating a switch-mode power factor correction (PFC) circuit connectable to a load, said circuit including a first buck switch, a second boost switch and an inductor in a buck boost circuit, said process comprising:

selectively applying input voltage to the PFC circuit, said input voltage being a rectified AC wave, and activating both of said buck switch and boost switch near zero current of said inductor, while limiting ON-time of the buck switch, for accelerating discharge of said inductor, wherein the buck switch ON-time ($t_{buck}$) and boost switch ON-time ($t_{boost}$), the PFC circuit input voltage (Vin) and the PFC circuit output voltage (Vo) conform with the equation:

$$(t_{buck}-t_{boost})/t_{boost}=Vin/Vo.$$

2. The process as claimed in claim 1, wherein during portions of the input voltage wave, each switch ON-time is controlled to facilitate smooth transition between operation modes of the PFC circuit.

3. The process claimed in claim 1 wherein, said buck switch ON-time is gradually reduced and said boost switch ON-time is gradually increased to facilitate smooth efficient transition from buck operation mode to buck-boost/Modified Boost operation mode and from boost operation mode to buck-boost/Modified Boost operation mode of the PFC circuit.

4. The process claimed in claim 1 wherein, said buck switch ON-time is gradually increased and said boost switch ON-time is gradually reduced to facilitate smooth transition from buck-boost/Modified Boost operation mode to boost operation mode and from buck-boost/Modified Boost operation mode to buck operation mode of the PFC circuit.

5. The process as claimed in claim 1, wherein during a discontinuous-critical-current mode (DCCM), the current is limited by controlling the charge time of the inductor.

6. The process as claimed in claim 1, further comprising activating a short term circuit shutoff during a development period of a voltage surge and deactivating said shutoff following a fading of the voltage surge.

7. The process as claimed in claims 1, further comprising reducing power delivered to the load for protection against overheating.

8. The process as claimed in claim 1, further comprising providing a circuit shutoff effected by comparison of a short-term mean value of a load voltage to a long-term mean value of a load voltage, for protection against short circuit.

9. The process as claimed in claim 1, wherein power delivered by the PFC circuit is limited to a predetermined maximum.

10. The process as claimed in claim 1, wherein the buck switch ON-time limitation secures the PFC circuit output voltage control.

11. The process as claimed in claim 1, wherein the buck switch ON-time limitation secures the PFC circuit input current control.

12. The process as claimed in claim 1, wherein Vin and Vo represent instantaneous values.

13. The process as claimed in claim 1, wherein Vin and Vo represent mean values.

14. A process for operating a switch-mode power factor correction (PFC) circuit connectable to a load, said circuit including a first buck switch, a second boost switch and an inductor in a buck boost circuit, said process comprising:

selectively applying input voltage to the circuit, said input voltage is a rectified AC wave, and activating both of said buck switch and boost switch near zero current of said inductor, while limiting the ON-time of the buck switch, in order to accelerate discharge of said inductor, wherein said buck switch ON-time ($t_{buck}$) and said boost switch ON-time ($t_{boost}$) obey the equation $t_{buck}-t_{boost}=k\,t_{boost}$; k being a real number preferably selectable between approximately 2 to approximately 6 and $t_{boost}=(2LPin/V^2in_{rms})\ g(k,Vin,Vo)$; L being the inductance of said inductor; Pin being the PFC input power; $V^2in_{rms}$ being the squared rms value of the PFC input voltage, and $g(k,Vin,Vo)$ being a correction factor, which is a function of the PFC circuit input voltage (Vin) and output voltage (Vo) with said k as a parameter.

15. The process as claimed in claim 14, wherein said correction factor $g(k,Vin,Vo)$ obeys the equation $g(k,Vin,Vo)=(m^2(1+k)+m)/(m(1+k)^2-k^2)$ where $m=Vin/Vo$.

16. The process as claimed in claim 15, wherein said correction factor $g(k,Vin,Vo)$ constitutes a set of linear functions of m, where $m=Vin/Vo$, and each of said linear functions having at least one intersection point with the factor $(m^2(1+k)+m)/(m(1+k)^2-k^2)$.

17. The process as claimed in claim 14, wherein Vin and Vo represent instantaneous values.

18. The process as claimed in claim 14, wherein Vin and Vo represent mean values.

19. The process as claimed in claim 14, wherein during portions of the input voltage wave, each switch ON-time is controlled to facilitate smooth transition between the operation modes of the PFC circuit.

20. The process as claimed in claim 14, wherein during discontinuous-critical-current mode (DCCM), the current is limited by controlling the charge time of the inductor.

21. The process as claimed in claim 14, further comprising activating a short term circuit shutoff during development period of a voltage surge and deactivating said shutoff following a fading of the voltage surge.

22. The process as claimed in claims 14, further comprising reducing power delivered to the load, for protection against overheating.

23. The process as claimed in claim 14, further comprising providing a circuit shutoff effected by comparison of a short-term mean value of a load voltage to a long-term mean value of a load voltage, for protection against short circuit.

24. The process as claimed in claim 14, wherein the power delivered by the PFC circuit is limited to a predetermined maximum.

25. The process as claimed in claim 14, wherein the buck switch ON-time limitation secures the PFC circuit output voltage control.

26. The process as claimed in claim 14, wherein the buck switch ON-time limitation secures the PFC circuit input current control.

* * * * *